US 6,588,081 B2

(12) United States Patent
Botos et al.

(10) Patent No.: US 6,588,081 B2
(45) Date of Patent: Jul. 8, 2003

(54) SMALL FOOTPRINT DIRECT DRIVE MECHANICAL POSITIONING STAGE

(75) Inventors: Stephen J. Botos, Pittsburgh, PA (US); Brian L. Favero, New Kensington, PA (US)

(73) Assignee: Aerotech, Inc., Pittsburgh, PA (US)

( * ) Notice: Subject to any disclaimer, the term of this patent is extended or adjusted under 35 U.S.C. 154(b) by 52 days.

(21) Appl. No.: 09/862,635

(22) Filed: May 21, 2001

(65) Prior Publication Data

US 2002/0129492 A1 Sep. 19, 2002

Related U.S. Application Data

(63) Continuation-in-part of application No. 09/812,241, filed on Mar. 19, 2001, now abandoned.

(51) Int. Cl.[7] .................... B25B 27/14; B23Q 1/25
(52) U.S. Cl. ................ 29/281.5; 269/73; 359/392; 359/393
(58) Field of Search .................. 269/73; 359/391, 359/392, 393; 29/281.5

(56) References Cited

U.S. PATENT DOCUMENTS 5,523,941 A * 6/1996 Burton et al. .............. 269/73
6,252,705 B1 * 6/2001 Lo et al. .................... 359/391

OTHER PUBLICATIONS

Aerotech catalog entitled "Automation Solutions for the Fiber–Optics Industry", pp. 1–20.
Newport web page downloads re Goniometric Cradles, pp. 3–24 –3–29.

* cited by examiner

Primary Examiner—P. W. Echols
(74) Attorney, Agent, or Firm—Webb Ziesenheim Logsdon Orkin & Hanson, P.C.

(57) ABSTRACT

A small footprint mechanical positioning stage capable of operating in two perpendicular orientations comprises a base plate, a carriage plate, linear bearings, a brushless linear motor, and a linear encoder. The linear bearings, the linear motor, and the encoder scale are all parallel to the direction of travel of the positioning stage.

26 Claims, 8 Drawing Sheets

SMALL FOOTPRINT DIRECT DRIVE MECHANICAL POSITIONING STAGE

RELATED APPLICATION

This application is a continuation-in-part of U.S. patent application Ser. No. 09/812,241 filed Mar. 19, 2001 now abandoned having the same title and assigned to the same assignee.

FIELD OF THE INVENTION

This invention relates to the field of direct drive mechanical stages for precision motion control. More specifically, it relates to small footprint linear motor driven positioning stages and multi-axis mechanical positioners useful in the alignment of optic fibers.

BACKGROUND OF THE INVENTION

Optic fibers are being used more and more for the transfer of information due to the large bandwidth and insensitivity to certain types of electromagnetic interference. Optic fibers are transparent glass fibers through which light waves encoded with information are passed. The fibers themselves are often less than 100 nm in diameter. Typically, they are enclosed in a protective coating. The fibers are not infinitely long and, therefore, it is necessary to align and bond fibers together. The alignment must be very precise, that is, the centers of the fibers must be aligned in order to minimize power loss across a bonded joint. Not only must fibers be joined end to end, fibers must be connected to tiny components, such as transmitters, amplifiers, and receivers. This process is referred to in the industry as pig-tailing.

In order to position fibers for fiber-to-fiber bonding or pig-tailing automatically, mechanical positioning stages and multi-axis mechanical positioners with extremely high resolution and repeatability are required. Very often, the bonding and pig-tailing take place in clean rooms. The expense of building and maintaining clean rooms is directly related to the volume of the room. Hence, miniaturization of the mechanical positioning stages for use in optic fiber alignment is extremely critical.

The extent of the motion required to execute the final fiber alignment is on the order of 100's of microns. This is due to the relatively small size of the fiber itself. Core diameters vary from 200 microns for multi-mode fibers down to 9 microns for single-mode fibers. The relative small distances required to align the fibers are dwarfed by the size of even the smallest positioning stages now in successful use.

The smallest possible alignment stage volume is currently attainable with stages driven by piezoelectric crystals mounted in structures known in the art as flexures. These tools have limited maximum travel. This lack of travel has necessitated the use of a combination of a coarse positioning stage (millimeters of travel) with a piezoelectric flexure stage if a movement greater than about 200 microns is required for the initial alignment and/or transferring to a position for final alignment. One marketed multi-axis mechanical positioner for fiber alignment uses piezoelectric flexures for the X and Y axes and a ball screw driven stage for the vertical axis. The ball screw drive is a mechanical contact driven device subject to wear. Also, the footprint is 4 inches by 7 inches. Yet another marketed multi-axis mechanical positioner for this application is entirely ball screw driven having a footprint of about 4.5 inches by 4 inches. It is, of course, inherently subject to the problems of mechanical wear and the backlash associated with ball screw driven stages. Perhaps the most successful multi-axis mechanical positioner now being marketed is entirely driven by noncontact permanent magnet linear motors. Due to the design of the motors and other factors, the size of the footprint is still a relatively large 5 inches by 7 inches.

In addition to the need for a small footprint, it is especially desirable that as much of the multi-axis mechanical positioner as possible be located below the table surface holding the remaining apparatus needed for effecting the fiber alignment. The auxiliary apparatus may comprise fixtures for holding optic fibers and or tiny parts to which the fibers are attached and robotic apparatus for picking and placing fibers and tiny components. The auxiliary apparatus may also be optical devices for robotic vision systems to aid in alignment. Hence, it is desirable that the multi-axis mechanical positioner and all the wiring associated with it be recessed below the top surface of the table.

Footprint and travel ranges are not the only criteria for selection of a positioning stage for fiber alignment applications. Speed, accuracy, repeatability, and positioning stability are also very critical.

It is an advantage, according to the present invention, to provide a small footprint linear motor driven positioning stage that has a combination of a small footprint, a long travel range, high speed, high accuracy, high repeatability, and high position stability that make it a superior choice for fiber alignment applications.

It is a further advantage, according to the present invention, to provide multi-axis mechanical positioners based upon the small footprint positioning stage.

It is yet a further advantage, according to the present invention, that the substantial portions of the multi-axis mechanical positioner can be recessed below the surface of the table to which it is directly secured without the need for suspending a platform below the surface of the table.

SUMMARY OF THE INVENTION

Briefly, according to the present invention, there is provided a small footprint mechanical positioning stage capable of operating in two perpendicular orientations. The stage comprises a base plate comprising a flat bed, a short platform rising from the bed near one edge of the bed, and a short perpendicular wall rising from the bed near an opposite edge of the bed. The stage further comprises a carriage plate comprising a flat table plate and a short side wall pendent from the table plate near one edge of the table plate.

A first linear bearing is positioned between the base plate and the carriage plate fixed to the platform rising from the flat bed and a second linear bearing is positioned between the base plate and the carriage plate fixed to the wall rising from the flat bed and the wall pendent from the carriage plate. The first linear bearing provides maximum support in the direction perpendicular to the flat bed and the table plate and the second linear bearing provides maximum support in the direction between edges of the flat bed and table plate parallel to the direction of travel of the stage. This enables the use of the stage in two perpendicular orientations.

A direct drive brushless linear motor comprises an armature winding fixed to the base plate having a magnetic focusing plate between the armature winding and the base plate and a rare earth magnet track fixed to the table plate having a magnetic focusing plate between the magnet track and the table plate. A linear encoder reader is fixed to the flat bed and an encoder scale is fixed to the table plate.

The first and second linear bearings, the linear motor, and the encoder scale are all oriented parallel to the direction of travel of the positioning stage. The distance between the table plate and the base plate is just sufficient to accommodate the linear motor, the linear encoder, and the linear bearings.

Two of the above-described stages can be handily combined into a small footprint X-Y mechanical positioner. A second small footprint mechanical positioning stage is arranged with its base plate affixed to the carriage plate of the first small footprint mechanical stage. Further, a small footprint X-Y-Z mechanical positioner can be assembled from two of the stages above described and a vertical left stage mounted on the carriage plate of the second small footprint mechanical stage.

A small footprint X-Y-Z-Theta mechanical positioner can be assembled from three of the above-described small footprint mechanical positioning stages by using two of the stages arranged on a foundation plate mounted with base plates thereof attached to edges of the foundation plate. Flanges may be secured to the upper edges of the two stages enabling them to be secured in a table opening extending downwardly from the table surface. A carriage plate parallel to the foundation plate bridges the carriage plates of the two small footprint mechanical positioning stages. The third small footprint mechanical positioning stage is mounted on the carriage plate oriented for travel perpendicular to the travel of the first and second small footprint mechanical positioning stages. A vertical lift stage is mounted on the carriage plate of the third small footprint mechanical positioning stage, and a rotary stage is mounted on the vertical lift stage. A five-axis small footprint mechanical positioner may be assembled by attaching a goniometric cradle mount to the rotary stage and a six-axis mechanical positioner may be assembled by attaching a double goniometric cradle to the rotary stage. This construction minimizes the vertical height of the four-, five-, and six-axis stages. It is facilitated by the fact that the above-described small axis linear stages are capable of two perpendicular orientations.

BRIEF DESCRIPTION OF THE DRAWINGS

Further features and other objects and advantages of the present invention will become clear from the following detailed description made with reference to the drawings in which.

DESCRIPTION OF THE PREFERRED EMBODIMENTS

Figure 1:
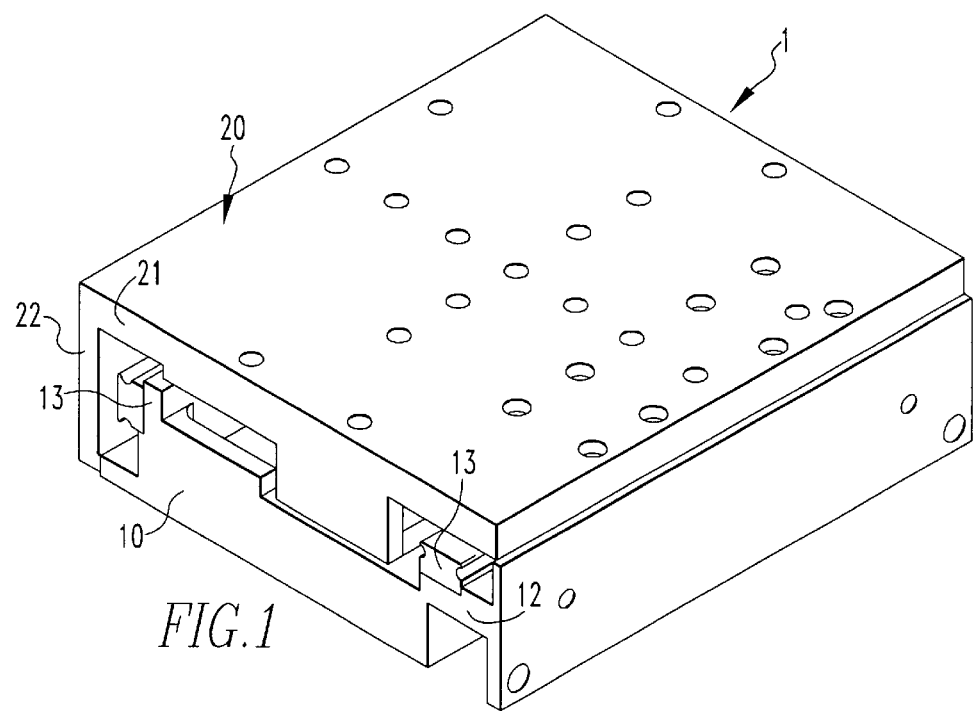
FIG. 1 is a perspective view of a small footprint mechanical positioning stage, according to the present invention.
Figure 3:
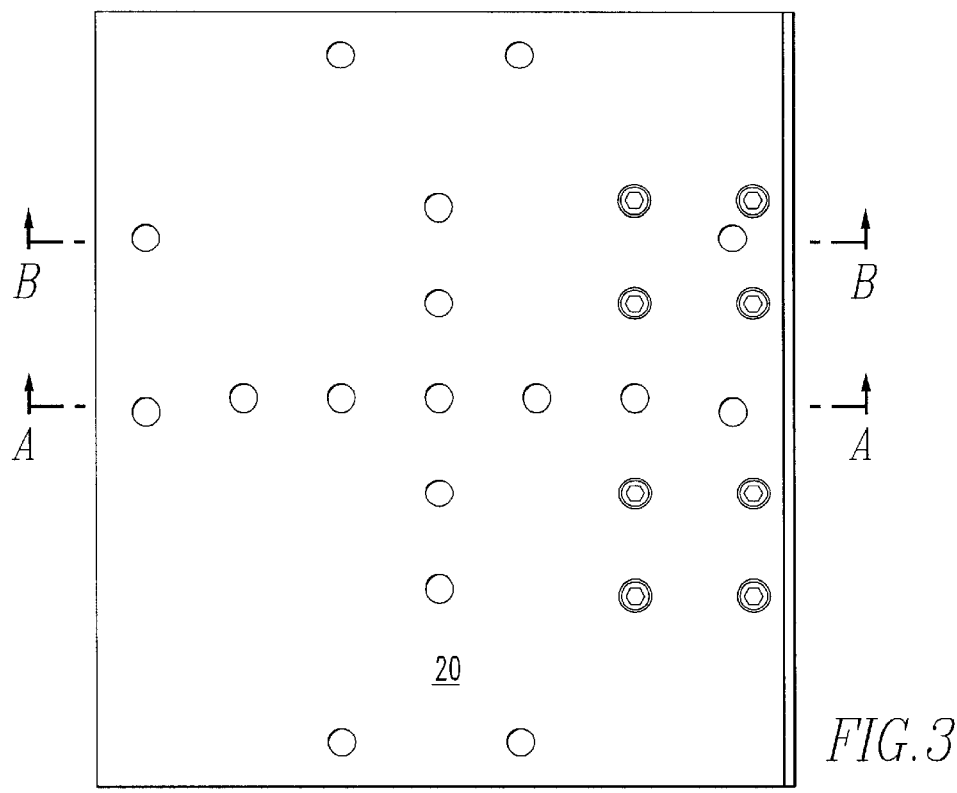
FIG. 3 is a top view of the stage shown in FIG. 1.

Referring now to FIG. 1, there is shown a perspective view of a small footprint mechanical positioning stage. The stage is comprised of a base plate 10 having a flat bed 11 (see FIGS. 4, 5, and 6) having two substantially parallel edges, a short raised platform 12 near one of the parallel edges of the flat bed 11, and a wall 13 spaced a short distance from the opposite edge of the flat bed 11 perpendicular thereto. Typically, the base plate 10 is machined from aluminum and aluminum alloys which are nonmagnetic and one-third as heavy as steel. The lighter weight reduces the inertia to be overcome by the linear motor. The positioning stage has a carriage plate 20 comprised of a table plate 21 and a perpendicular pendent side wall 22. Typically, the carriage plate 20 is machined from aluminum and aluminum alloys. The footprint of the positioning stage has been successfully reduced to 90×100 mm (3.542×3.937 inches). The total height of the stage is about 33 mm (1.299 inches). This compact size is made possible by the unique arrangement of the linear bearings and linear motor which connect and drive the base plate 10 relative to the carriage plate 20.

Figure 4:
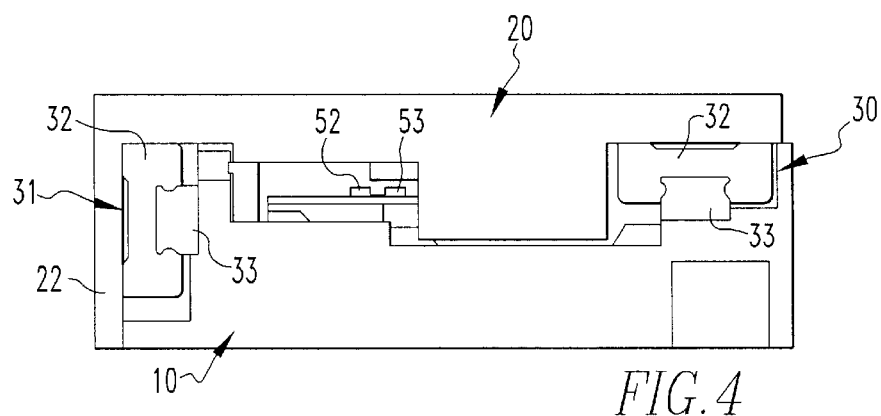
FIG. 4 is an end view of the stage shown in FIG. 3.
Figure 5:
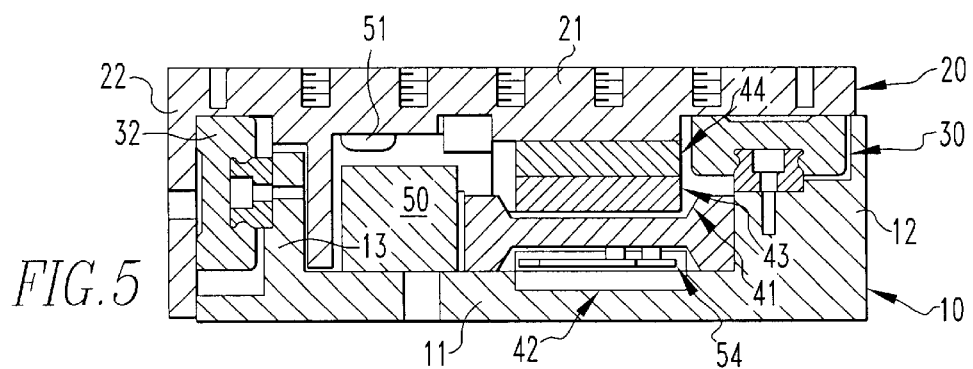
FIG. 5 is a view of a section taken along lines A—A in FIG. 3.
Figure 6:
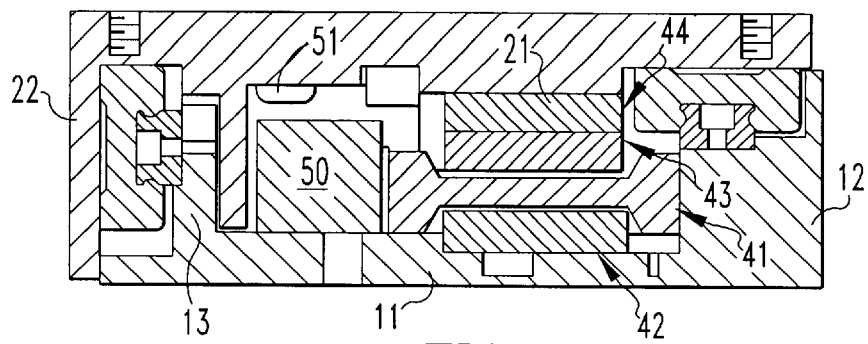
FIG. 6 is a view of a section taken along lines B—B in FIG. 3.

Referring to FIGS. 4, 5, and 6, a first linear bearing 30 (linear motion guide) is fixed between the table plate 21 and the raised platform 12. As shown in this particular embodiment, a rail 33 is attached to the raised platform 12 and one or more slides 32 are attached to the underside of the table plate 21. Suitable linear bearings are sold by THK LM Systems and have a design based upon balls bearing upon the rail 33 and that rotate in raceways in the slides 32. A second linear bearing 31 is positioned between the wall 13 rising from the flat bed 11 of the base plate 10 and the side wall 22 pendant from the table plate 21. As shown in this particular embodiment, the rail 33 is attached to the wall 13 rising from the flat bed 11 and one or more slides 32 are attached to the side wall 22. In this arrangement, the flat bed 11 and the table plate 21 are spaced sufficiently apart to accommodate a single-sided permanent magnet linear motor.

The linear motor comprises armature winding 41 fixed to the base plate 10 with a magnetic focusing plate 42 between the armature winding 41 and the flat bed 11. A rare earth magnet track 43 is fixed to the table plate 21 with a magnetic focusing plate 44 between the magnet track 43 and the table plate 21. As the linear motor is an electronically commutated, brushless linear motor, a Hall effect sensor 54 is mounted to generate commutation signals as the Hall effect sensor 54 encounters the changing polarity of the magnet track 43. The motor is a direct drive motor because no ball screw or the like is between the motor and the stage.

According to a preferred embodiment of the present invention, the armature winding is a three-phase slotless bifurcated winding, the magnetic pole pitch of the magnet track 43 is less than about 16 mm, and the armature winding 41 has a coil width of less than about 4 mm. The magnet track 43 is at least 90 mm long and the armature winding 41 is at least 60 mm long. In this configuration, with the rare magnets and the magnetic focusing plates 42, the positioning stage can move loads up to five kilograms a distance of 25 mm at the velocity of approximately 250 mm per second.

The linear position of the carriage is precisely controlled by feedback from a linear encoder. The linear encoder is positioned in the space between the flat bed 11 and the table plate 21 alongside the linear motor. An encoder scale 51 is mounted on the underside of the table plate 21 parallel to the direction of travel. An encoder reader 50 is mounted below the encoder scale 51 on the flat bed 11. A home sensor 52 and limit switches 53 are mounted relative to the flat bed 11. A suitable encoder comprises an RGH 22 read head manufactured by the Renishaw Company along with Renishaw's 20 micron RGS-S tape scale. This encoder reader-scale combination can provide an output resolution of 50 nm. Preferably, the encoder scale has a 20 micron pitch and is approximately 75 mm long. By use of an encoder multiplier, such as the MX Series multipliers manufactured by Aerotech, Inc. of Pittsburgh, Pa., the resolution of the stage position can be reduced to 20 nm and even to 10 nm. Calibrated accuracy of + or −0.5 micron and repeatability of 0.1 micron are thereby possible.

Figure 2:
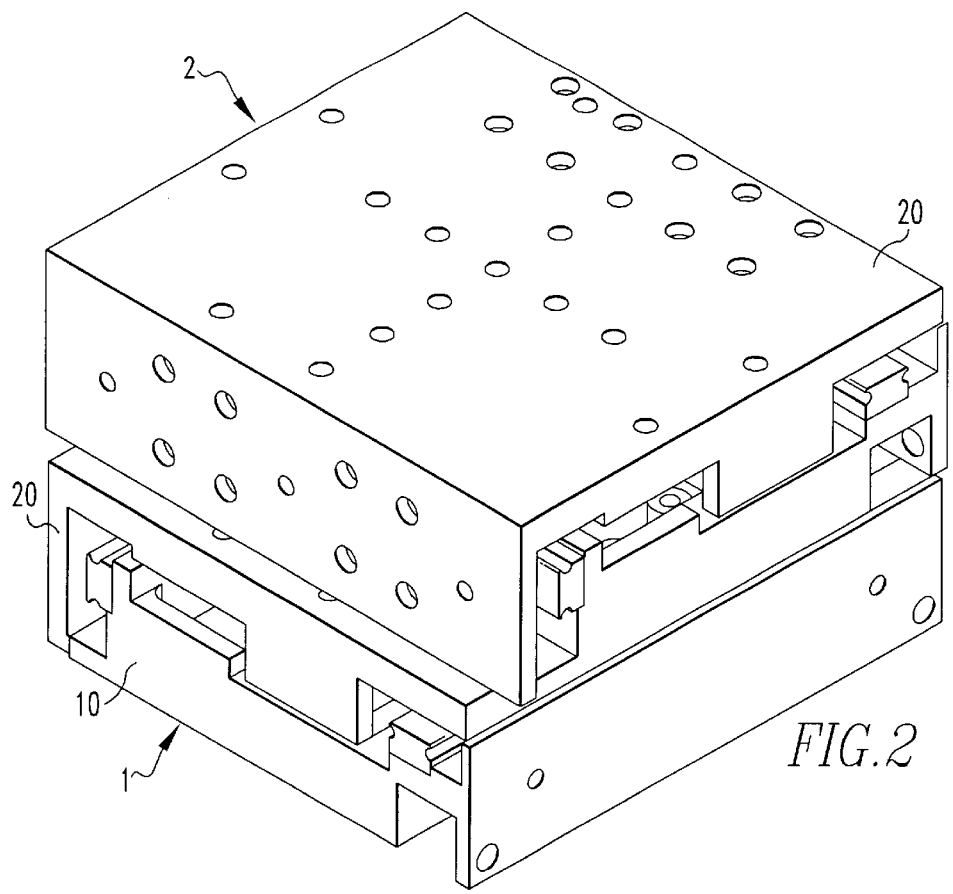
FIG. 2 illustrates two of the stages shown in FIG. 1 assembled into an X-Y positioning stage.

FIG. 2 illustrates how a small footprint X-Y positioning stage can be assembled from the above-described small footprint positioning stage. The second small footprint positioning stage 2 is arranged with its base plate 10 affixed to the carriage plate 20 of the first small footprint positioning stage 1.

Figure 7:
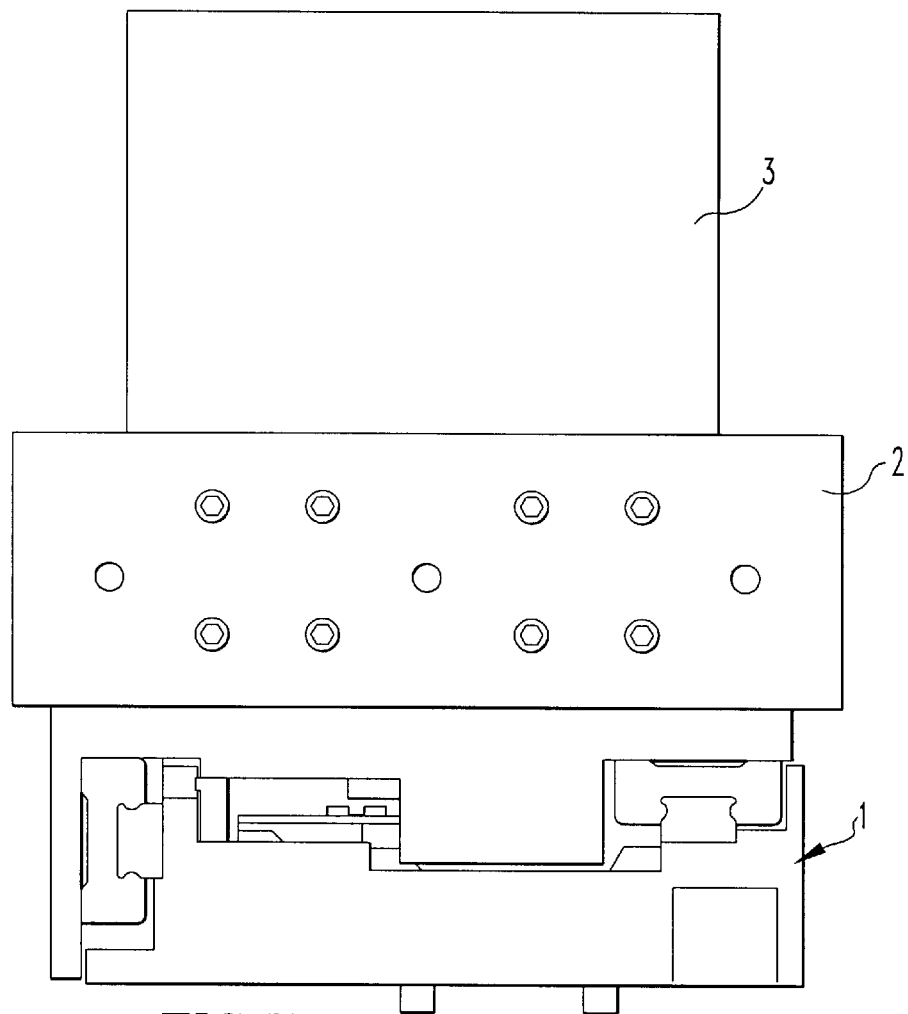
FIG. 7 is a side view of an X-Y-Z mechanical positioner wherein a vertical lift stage is mounted on top of two cross-mounted small footprint mechanical positioning stages, according to the present invention.

FIG. 7 illustrates a small footprint X-Y-Z mechanical positioner assembled from two of the above-described linear positioning stages, 1 and 2, with a vertical lift stage 3 mounted on the carriage plate 20 of the second small footprint mechanical stage 2. A suitable vertical lift stage is described in U.S. patent application Ser. No. 09/812,234 entitled "Small Footprint Vertical Lift and Rotation Stage" filed on Mar. 19, 2001, now U.S. Pat. No. 6,486,574, and assigned to a common assignee. That application is incorporated herein by reference.

Figure 9:
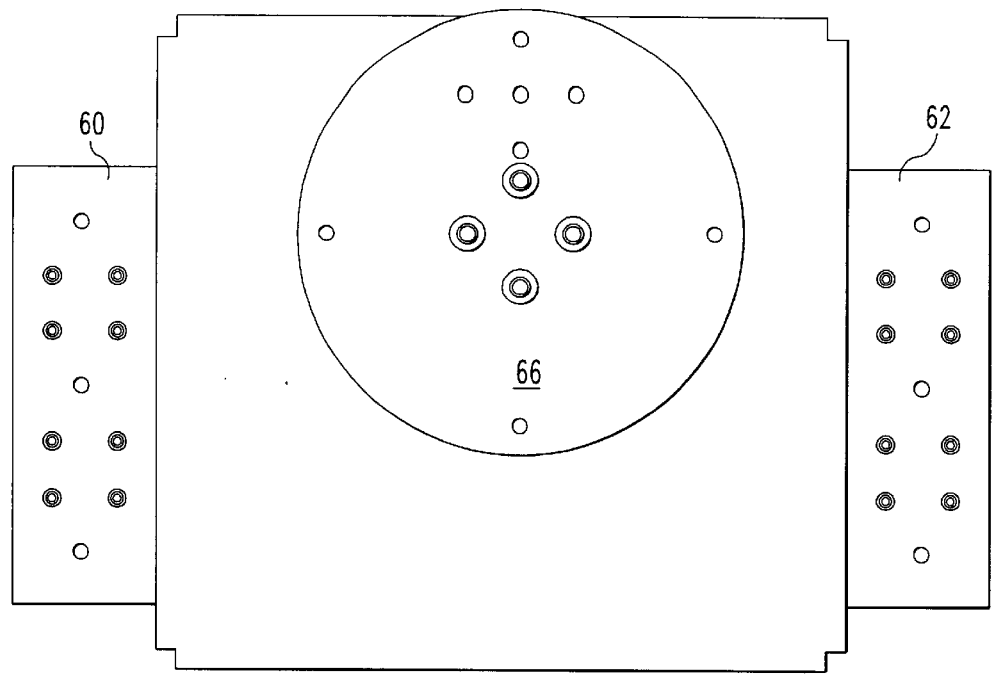
FIGS. 8 and 9 are side and top views, respectively, of an X-Y-Z-Theta mechanical positioner assembled from three small footprint mechanical positioning stages, according to the present invention, two of which are set upon a narrow edge.
Figure 8:
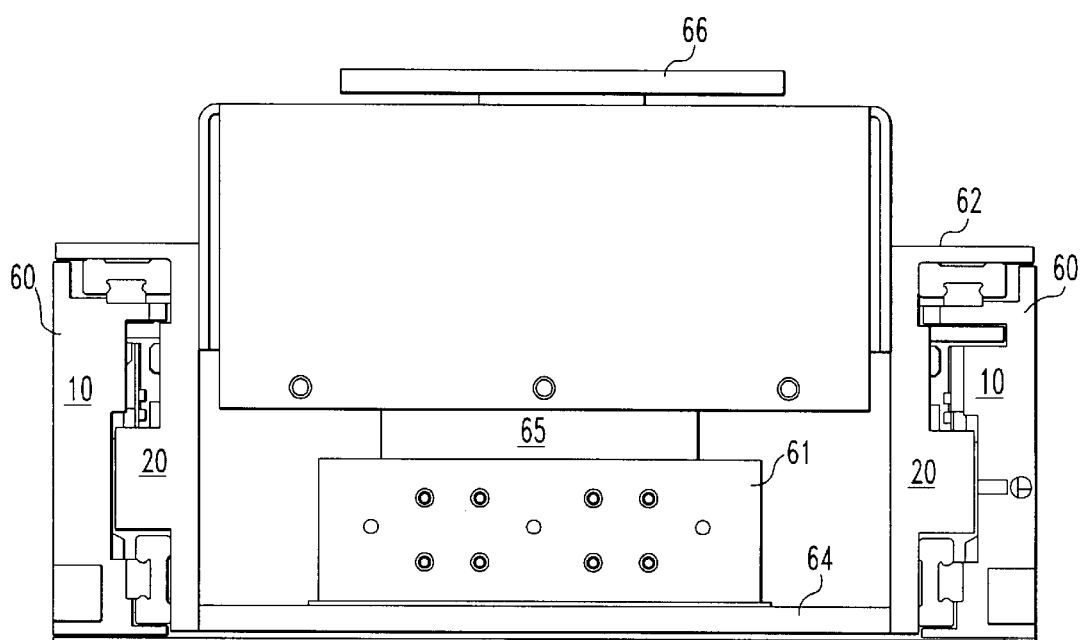

Referring to FIGS. 8 and 9, there is shown a small footprint X-Y-Z-Theta mechanical positioner assembled from three small footprint mechanical stages 60, 61, and 62. Stages 60 and 62 are arranged on a foundation plate 63 with the base plates 10 attached to the edges of the foundation plate 63. A carriage plate 64 bridges the carriage plates 20 of the stages 60 and 62. Centered on the carriage plate 64 is small footprint mechanical positioning stage 61. Stages 60 and 62 work together to provide the X motion and stage 61 provides the Y motion. Mounted atop the positioning stage 61 is vertical lift positioning stage 65 which has a rotary positioning stage 66 associated therewith. The vertical lift positioning stage 65 and associated rotary positioning stage 66 are described in the application referred to above.

Figure 10:
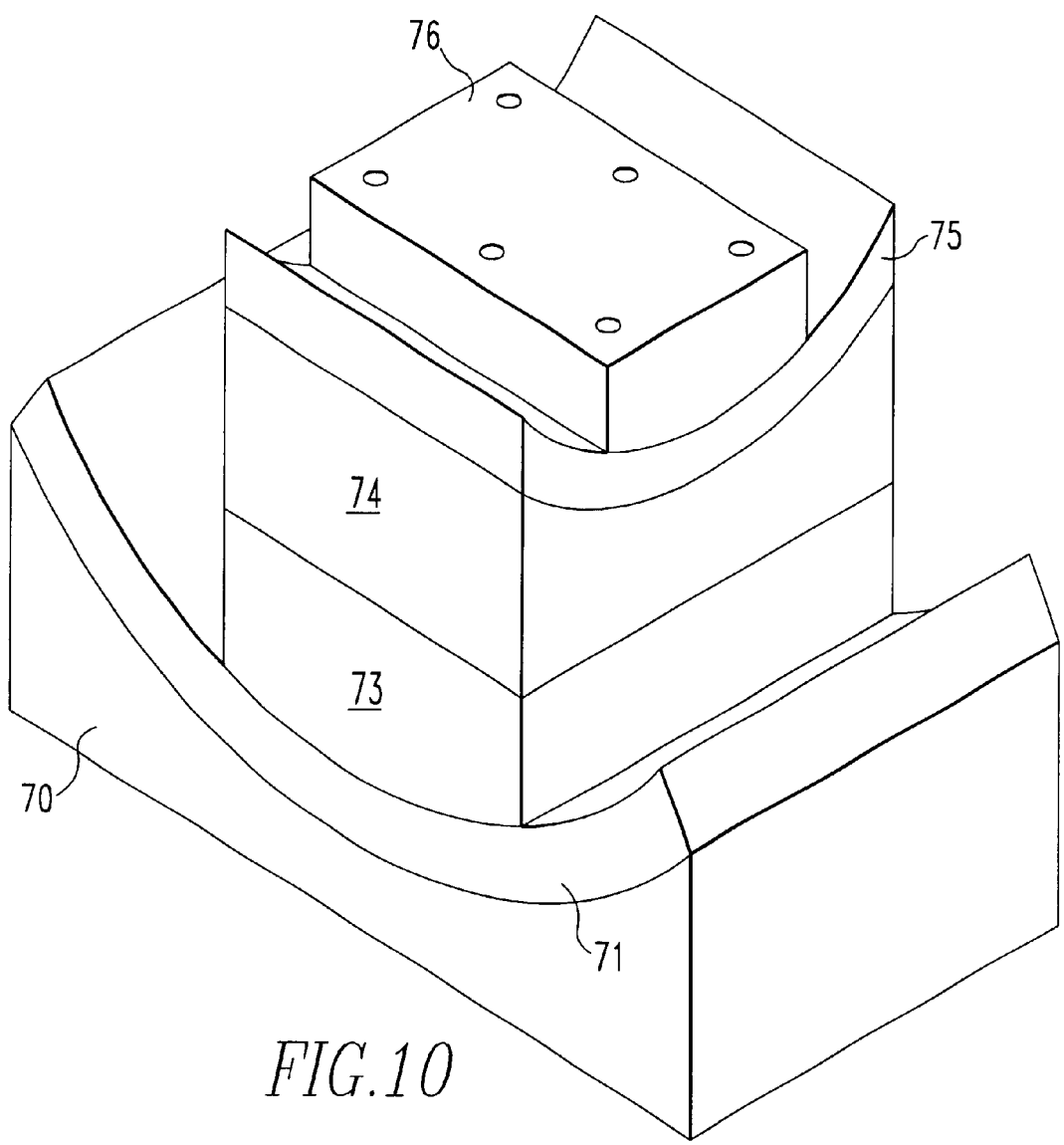
FIG. 10 is a schematic perspective view of a two-stage goniometer which may be fixed to the X-Y-Z-Theta mechanical positioner to provide a six-axis positioning stage.

Referring to FIG. 10, there is shown a double goniometric cradle which can be mounted to the rotary positioning stage 66 to provide a six-axis mechanical positioner. The first goniometer has a base 70 with associated slide 71 and table 73. The second goniometer which is mounted on table 73 has a base 74 rotating slide 75 and table 76. The slides 71, 75 are driven relative to the base 70 by brushless permanent magnet curvilinear motors with encoder feedback. Hence, in the six-axis mechanical positioner, all stages are driven by brushless permanent magnet motors with encoder feedback enabling precise positioning. An improved embodiment of the double goniometric cradle is described in an application entitled "Direct Drive Tilt and Goniometer Stage" filed of even date herewith and assigned to the same assignee.

Figure 11:
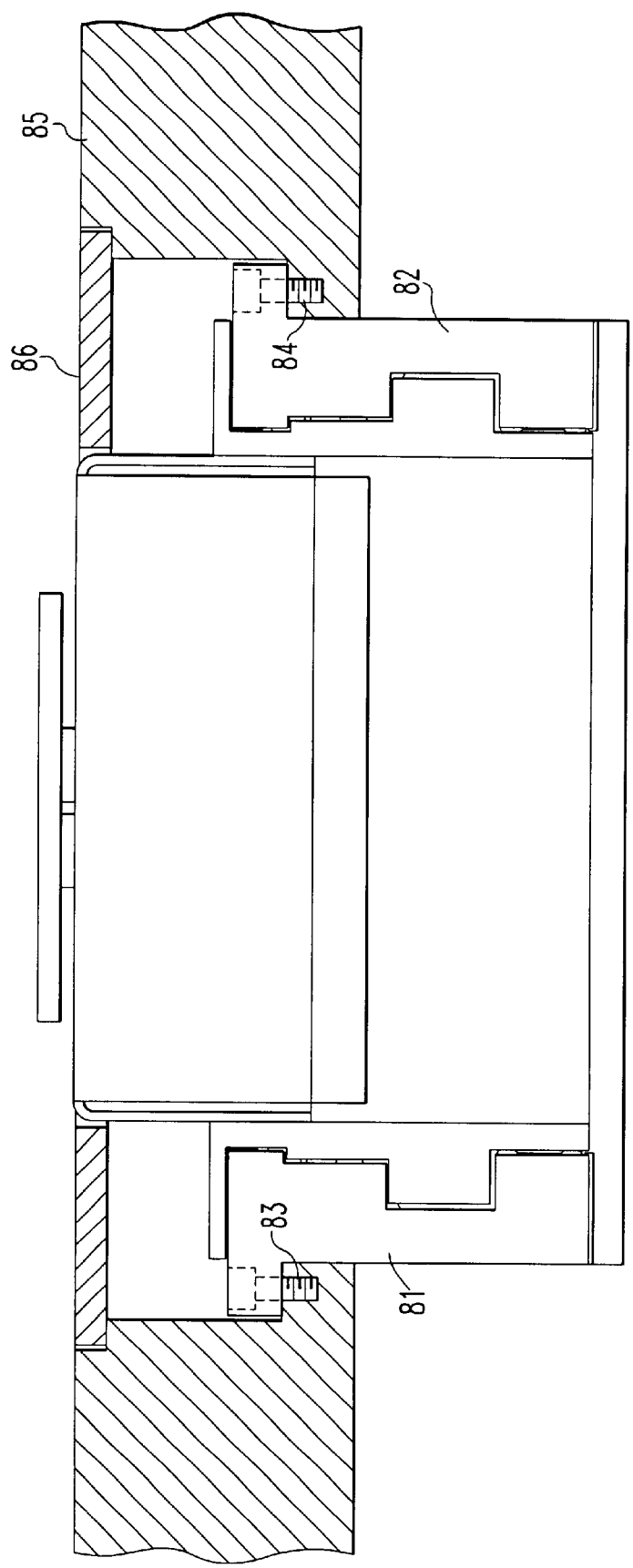
FIG. 11 is a side view of the X-Y-Z-Theta mechanical positioner shown in FIGS. 8 and 9 hung below the work surface of a table.

Referring now to FIG. 11, there is shown a side view of the X-Y-Z-Theta mechanical positioner suspended below the working surface of a table having an opening in the table top 85. Each of the vertically oriented small footprint linear motor driven stages 81 and 82 has flanges 83, 84 which can be brought to rest in a recess in the table top 85 (shown in section). Plate 86 covers the space above the linear motor driven stages 81, 82. The ability to suspend the X-Y-Z-Theta mechanical positioner below the table surface without constructing a pendent platform, which would likely introduce instability, is directly related to the ability of the vertically oriented small footprint mechanical positioning stages to be directly connected to the edges of a hole in the table top 85. Hence, it is not necessary to build a separate platform suspended below table top 85 to receive the stage.

Figure 12:
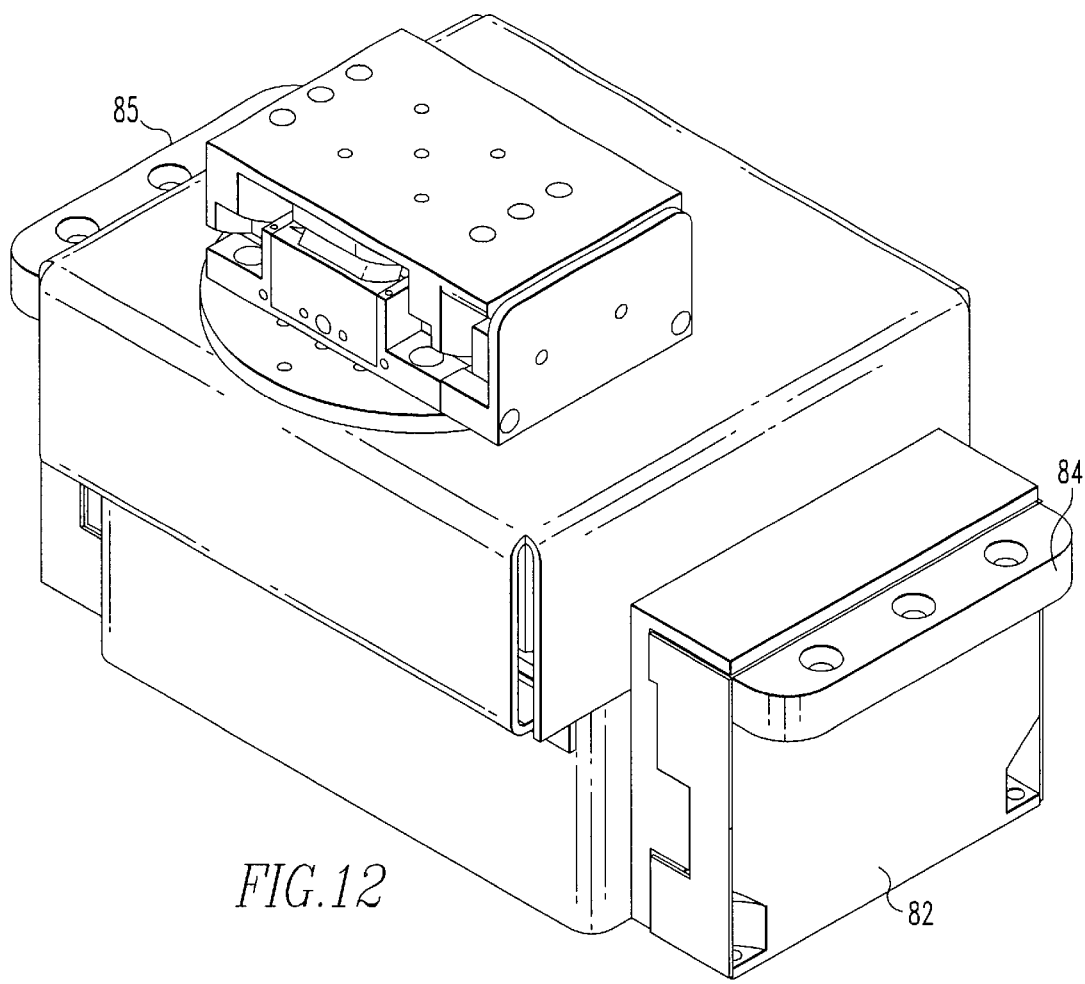
FIG. 12 is a perspective view of the X-Y-Z-Theta mechanical positioner of FIG. 11 with a single tilt stage mounted thereon.
Figure 13:
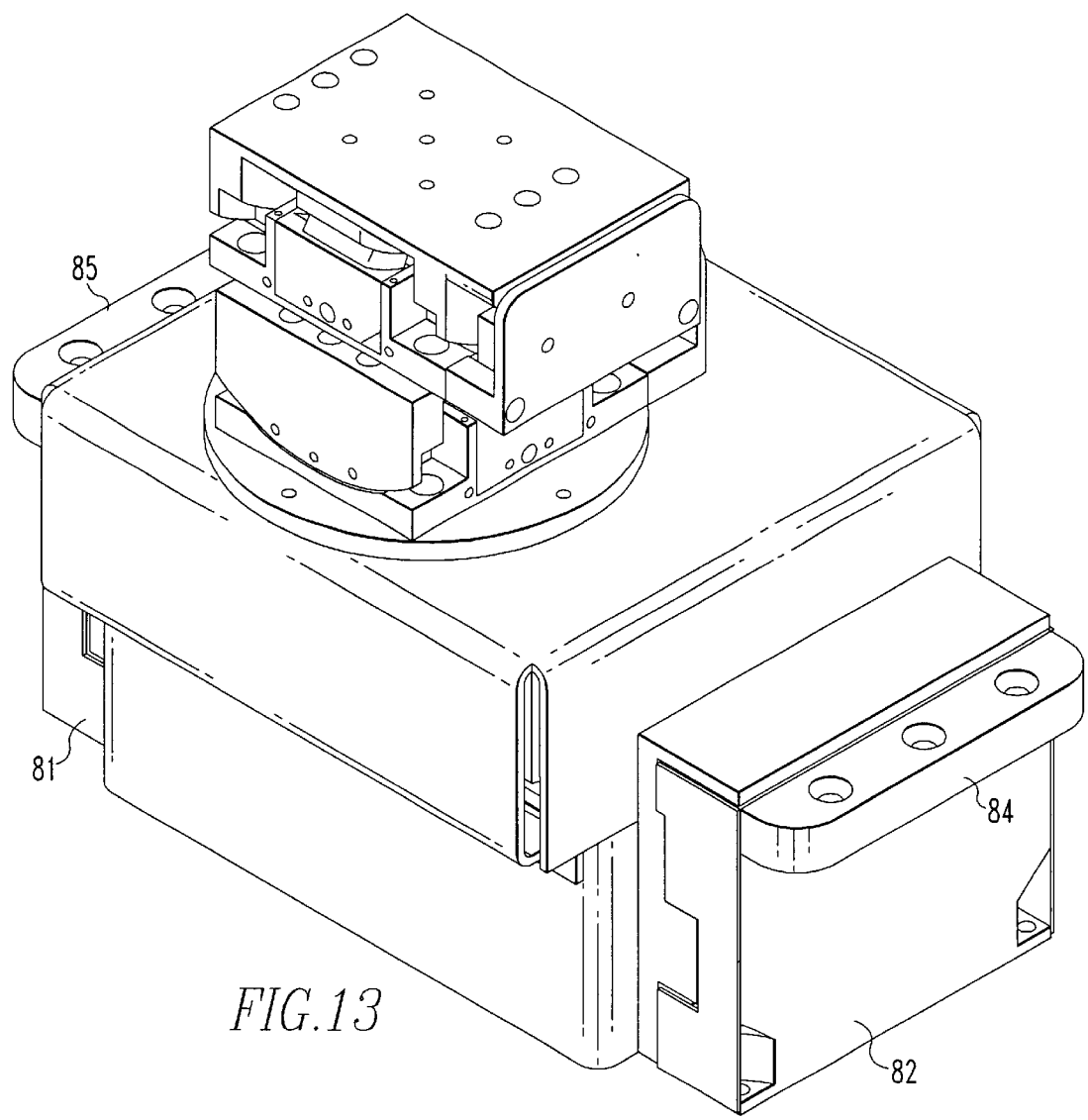
FIG. 13 is a perspective view of the X-Y-Z-Theta mechanical positioner of FIG. 11 with two tilt stages mounted thereon for movement in perpendicular directions.

FIG. 12 is a perspective view of the X-Y-Z-Theta (yaw) mechanical positioner with flanges 83, 84 enabling the stage to be suspended below the table top 85. A tilt stage is shown attached to the top of the Theta stage to provide a five-axis mechanical positioner. FIG. 13 is similar to FIG. 12 except that two tilt stages are shown attached to the Theta stage to provide a six-axis mechanical positioner. In an embodiment not illustrated, the second tilt axis can be mounted on the table surface adjacent to the five-axis mechanical positioner to enable the six-axis alignment of the fiber optics.

Having thus described our invention with the detail and particularity required by the Patent Laws, what is desired protected by Letters Patent is set forth in the following claims.

We claim:

1. A small footprint mechanical positioning stage capable of operating in two perpendicular orientations comprising:

a base plate comprising a flat bed, a short platform rising from the bed near one edge of the bed, and a short perpendicular wall rising from the bed near an opposite edge of the bed;

a carriage plate comprising a flat table plate and a short side wall pendent from the table plate near one edge of the table plate;

a first linear bearing between the base plate and the carriage plate fixed to the platform rising from the flat bed;

a second linear bearing between the base plate and the carriage plate fixed to the wall rising from the flat bed and the wall pendent from the table plate;

a brushless linear motor comprising an armature winding fixed to the base plate and a rare earth magnet track fixed to the table plate;

a linear encoder comprising an encoder reader fixed to the flat bed and an encoder scale fixed to the table plate;

the first and second linear bearings, the linear motor, and the encoder scale all being parallel to the direction of travel of the positioning stage;

the distance between the table plate and the base plate being sufficient to accommodate the linear motor, the linear encoder, and the linear bearings; and whereby the first linear bearing provides maximum support in the direction perpendicular to the flat bed and the table plate and the second linear bearing provides maximum support in the direction between edges of the flat bed and table plate parallel to the direction of travel of the stage.

2. The positioning stage according to claim 1, further comprising a first magnetic focusing plate between the armature winding and the base plate and a second magnetic focusing plate between the magnet track and the table plate.

3. The positioning stage according to claim 1, further comprising a home sensor and limit switches.

4. The positioning stage according to claim 1, having a Hall effect sensor to travel with the carriage to generate commutation signals.

5. The positioning stage according to claim 1, wherein the armature winding is a three-phase bifurcated winding.

6. The positioning stage according to claim 1, wherein the magnetic pole pitch of the magnet track is less than about 16 mm.

7. The positioning stage according to claim 1, wherein the armature winding has a coil width of less than about 4 mm.

8. The positioning stage according to claim 1, wherein the linear encoder provides a resolution of at least 50 nm.

9. The positioning stage according to claim 1, wherein the encoder scale has a 20 micron pitch and is approximately 75 mm long.

10. The positioning stage according to claim 1, providing at least 20 mm travel.

11. The positioning stage according to claim 9, wherein the armature winding is at least 60 mm long.

12. The positioning stage according to claim 9, wherein the magnet track is at least 90 mm long.

13. A small footprint X-Y mechanical positioner comprising:
- a first small footprint mechanical positioning stage as described in claim 1; and
- a second small footprint mechanical positioning stage as described in claim 1 with its base plate affixed to the carriage plate of the first small footprint mechanical stage.

14. A small footprint X-Y-Z mechanical positioner comprising:
- a first small footprint mechanical positioning stage as described in claim 1;
- a second small footprint mechanical positioning stage as described in claim 1 with its base plate affixed to the carriage plate of the first small footprint mechanical stage; and
- a vertical lift stage mounted on the carriage plate of the second small footprint mechanical stage.

15. A small footprint X-Y-Z-Theta mechanical positioner comprising:
- a base plate;
- first and second small footprint mechanical positioning stages as described in claim 1 mounted with base plates thereof attached to edges of the base;
- a carriage plate parallel to the base plate fixed to the carriage plates of the two small footprint mechanical positioning stages;
- a third small footprint mechanical positioning stage as described in claim 1 mounted on the carriage plate oriented for travel perpendicular to the travel of the first and second small footprint mechanical positioning stages;
- a vertical lift stage mounted on the carriage plate of the third small footprint mechanical positioning stage; and
- a rotary stage driven by a brushless permanent magnet motor mounted on the vertical lift stage.

16. A five-axis small footprint mechanical positioner comprising:
- a base plate;
- first and second small footprint mechanical positioning stages as described in claim 1 mounted with base plates thereof attached to edges of the base;
- a carriage plate parallel to the base plate fixed to the carriage plates of the two small footprint mechanical positioning stages;
- a third small footprint mechanical positioning stage as described in claim 1 mounted on the carriage plate oriented for travel perpendicular to the travel of the first and second small footprint mechanical positioning stages;
- a vertical lift stage mounted on the carriage plate of the third small footprint mechanical positioning stage;
- a rotary stage driven by a brushless permanent magnet motor mounted on the vertical lift stage; and
- a goniometer driven by a permanent magnet motor mounted on the rotary stage.

17. A six-axis small footprint mechanical positioner comprising the five-axis positioning stage of claim 16 with a second goniometer driven by a permanent magnet motor mounted on the goniometer.

18. A small footprint X-Y mechanical positioner comprising first and second linear positioning stages, each positioning stage comprising:
- a nonmagnetic base plate comprising a flat bed;
- a nonmagnetic carriage plate comprising a flat table plate;
- first and second linear bearings between the base plate and the carriage plate;
- a direct drive brushless linear motor comprising an armature winding fixed to the flat bed and a rare earth magnet track fixed to the table plate;
- a linear encoder comprising an encoder reader fixed to the flat bed and an encoder scale fixed to the table plate;
- the first and second linear bearings, the linear motor, and the encoder scale all being parallel to the direction of travel of the positioning stage;
- the distance between the table plate and the base plate being sufficient to accommodate the linear motor, the linear encoder, and the linear bearings;
- a first magnetic focusing plate between the armature winding and the base plate and a second magnetic focusing plate between the magnet track and the table plate; and
- the base plate of the first linear stage being fixed to the carriage plate of the second linear stage.

19. A small footprint X-Y-Z mechanical positioner comprising first and second linear positioning stages, each positioning stage comprising:
- a nonmagnetic base plate comprising a flat bed;
- a nonmagnetic carriage plate comprising a flat table plate;
- first and second linear bearings between the base plate and the carriage plate;
- a direct drive brushless linear motor comprising an armature winding fixed to the flat bed and a rare earth magnet track fixed to the table plate;
- a linear encoder comprising an encoder reader fixed to the flat bed and an encoder scale fixed to the table plate;
- the first and second linear bearings, the linear motor, and the encoder scale all being parallel to the direction of travel of the positioning stage;
- the distance between the table plate and the base plate being sufficient to accommodate the linear motor, the linear encoder, and the linear bearings;
- a first magnetic focusing plate between the armature winding and the base plate and a second magnetic focusing plate between the magnet track and the table plate;

the base plate of the first linear stage being fixed to the carriage plate of the second linear stage; and a vertical lift stage mounted on the carriage plate of the topmost linear stage.

20. A small footprint X-Y-Z-Theta mechanical positioner comprising:

a cross plate; and first and second linear positioning stages, each linear positioning stage comprising:

a nonmagnetic base plate comprising a flat bed;

a nonmagnetic carriage plate comprising a flat table plate;

first and second linear bearings between the base plate and the carriage plate;

a direct drive brushless linear motor comprising an armature winding fixed to the flat bed and a rare earth magnet track fixed to the table plate;

a linear encoder comprising an encoder reader fixed to the flat bed and an encoder scale fixed to the table plate;

the first and second linear bearings, the linear motor, and the encoder scale all being parallel to the direction of travel of the positioning stage;

the distance between the table plate and the base plate being sufficient to accommodate the linear motor, the linear encoder, and the linear bearings;

a first magnetic focusing plate between the armature winding and the base plate and a second magnetic focusing plate between the magnet track and the table plate;

said first and second linear positioning stages mounted to the cross plate at the lower edges of their base plates;

a carriage plate parallel to the cross plate fixed to the carriage plates of the two linear positioning stages;

a third linear positioning stage mounted on the carriage plate oriented for travel perpendicular to the travel of the first and second linear positioning stages;

a vertical lift stage mounted on the carriage plate of the third linear positioning stage; and a rotary stage mounted on the vertical lift stage.

21. A small five-axis mechanical positioner comprising:

a cross plate; and first and second linear positioning stages, each linear positioning stage comprising:

a nonmagnetic base plate comprising a flat bed;

a nonmagnetic carriage plate comprising a flat table plate;

first and second linear bearings between the base plate and the carriage plate;

a direct drive brushless linear motor comprising an armature winding fixed to the flat bed and a rare earth magnet track fixed to the table plate;

a linear encoder comprising an encoder reader fixed to the flat bed and an encoder scale fixed to the table plate;

the first and second linear bearings, the linear motor, and the encoder scale all being parallel to the direction of travel of the positioning stage;

the distance between the table plate and the base plate being sufficient to accommodate the linear motor, the linear encoder, and the linear bearings;

a first magnetic focusing plate between the armature winding and the base plate and a second magnetic focusing plate between the magnet track and the table plate;

said first and second linear positioning stages mounted to the cross plate at the lower edges of their base plates;

a carriage plate parallel to the cross plate fixed to the carriage plates of the two linear positioning stages;

a third linear positioning stage mounted on the carriage plate oriented for travel perpendicular to the travel of the first and second linear positioning stages;

a vertical lift stage mounted on the carriage plate of the third linear positioning stage;

a rotary stage mounted on the vertical lift stage; and a tilt stage mounted on the rotary stage.

22. A six-axis mechanical positioner comprising the five-axis mechanical positioner of claim 21 with a second tilt stage mounted on the first tilt stage.

23. A mechanical positioner according to claims 18–22 mountable on a work surface wherein the first and second linear positioning stages have a flange or bracket attached to the base plates thereof for suspending the positioning stage at least partially below the work surface.

24. A mechanical positioner according to claim 20, wherein the vertical lift stage and rotary stage are driven by a direct drive brushless permanent magnet motor.

25. A mechanical positioner according to claim 21 or 22, wherein the vertical lift stage, the rotary stage, and the tilt stage are all driven by a direct drive brushless permanent magnet motor.

26. A mechanical positioner according to claim 22, wherein the second tilt stage is driven by a direct drive brushless permanent magnet motor.

* * * * *